United States Patent
Zeng

(10) Patent No.: US 10,636,122 B2
(45) Date of Patent: Apr. 28, 2020

(54) METHOD, DEVICE AND NONVOLATILE COMPUTER-READABLE MEDIUM FOR IMAGE COMPOSITION

(71) Applicant: GUANGDONG OPPO MOBILE TELECOMMUNICATIONS CORP., LTD., Dongguan, Guangdong (CN)

(72) Inventor: Yuanqing Zeng, Guangdong (CN)

(73) Assignee: Guangdong Oppo Mobile Telcommunications Corp., Ltd., Dongguan (CN)

( * ) Notice: Subject to any disclaimer, the term of this patent is extended or adjusted under 35 U.S.C. 154(b) by 41 days.

(21) Appl. No.: 16/006,995

(22) Filed: Jun. 13, 2018

(65) Prior Publication Data

US 2018/0365807 A1    Dec. 20, 2018

(30) Foreign Application Priority Data

Jun. 16, 2017  (CN) .......................... 2017 1 0459600

(51) Int. Cl.
*G06T 5/00*   (2006.01)
*G06T 5/50*   (2006.01)
(Continued)

(52) U.S. Cl.
CPC ............. *G06T 5/002* (2013.01); *G06T 5/009* (2013.01); *G06T 5/50* (2013.01); *G06T 7/0002* (2013.01);
(Continued)

(58) Field of Classification Search
CPC .......... G06T 5/009; G06T 5/50; G06T 7/0002
See application file for complete search history.

(56) References Cited

U.S. PATENT DOCUMENTS 8,542,919 B2   9/2013  Seo
8,730,353 B2   5/2014  Park
(Continued)

FOREIGN PATENT DOCUMENTS

CN   102905058 A   1/2013
CN   103168462 A   6/2013
(Continued)

OTHER PUBLICATIONS

International Search Report in international application No. PCT/CN2018/089278, dated Sep. 4, 2018.
(Continued)

*Primary Examiner* — Edward Park
(74) *Attorney, Agent, or Firm* — Ladas & Parry LLP

(57) ABSTRACT

A method for image composition is disclosed, including: acquiring a plurality of images to be processed for a scene, and brightness information of each of the plurality of images to be processed respectively; acquiring difference information for the each of the plurality of images to be processed based on the brightness information of the each of the plurality of images to be processed; obtaining a reference image from the plurality of images to be processed based on the difference information for the each of the plurality of images to be processed; acquiring a weight of the each of the plurality of images to be processed respectively based on feature information of the reference image and feature information of the plurality of images to be processed; and compositing the plurality of images to be processed based on the weight of the each of the plurality of images to be processed. A device and a nonvolatile computer readable storage medium are also disclosed.

16 Claims, 3 Drawing Sheets

(51) Int. Cl.
*H04N 5/235* (2006.01)
*G06T 7/00* (2017.01)

(52) U.S. Cl.
CPC ......... *H04N 5/2351* (2013.01); *H04N 5/2355* (2013.01); *G06T 2207/20182* (2013.01); *G06T 2207/20216* (2013.01); *G06T 2207/20221* (2013.01)

(56) References Cited

U.S. PATENT DOCUMENTS

| | | | |
|---|---|---|---|
| 2011/0311156 | A1 | 12/2011 | Seo |
| 2012/0162405 | A1* | 6/2012 | Inagaki .................. H05K 13/08 348/87 |
| 2013/0002941 | A1 | 1/2013 | Park |
| 2014/0072232 | A1* | 3/2014 | Zheng .................. G06T 3/4053 382/199 |
| 2014/0079333 | A1 | 3/2014 | Hirai |
| 2014/0211034 | A1* | 7/2014 | Tanaka .................. G06T 5/002 348/218.1 |
| 2014/0212065 | A1 | 7/2014 | Hirai |
| 2014/0307044 | A1 | 10/2014 | Sharma et al. |
| 2014/0307960 | A1 | 10/2014 | Sharma et al. |

FOREIGN PATENT DOCUMENTS

| | | |
|---|---|---|
| CN | 103843033 A | 6/2014 |
| CN | 104205804 A | 12/2014 |
| CN | 104349068 A | 2/2015 |
| CN | 105825238 A | 8/2016 |
| CN | 105931206 A | 9/2016 |
| CN | 107330867 A | 11/2017 |
| EP | 2688288 A1 * | 1/2014 |

OTHER PUBLICATIONS

English Translation of the Written Opinion of the International Search Authority in international application No. PCT/CN2018/089278, dated Sep. 4, 2018.
European Search Report in European application No. 18176676.7, dated Oct. 29, 2018.
English Abstract of CN 105931206.
English Abstract of CN 105825238.
English Abstract of CN 107330867.

* cited by examiner

METHOD, DEVICE AND NONVOLATILE COMPUTER-READABLE MEDIUM FOR IMAGE COMPOSITION

CROSS REFERENCE TO RELATED APPLICATIONS

This application claims priority to Chinese patent application No. 201710459600.8 titled "METHOD, DEVICE, COMPUTER-READABLE MEDIUM AND COMPUTER DEVICE FOR IMAGE COMPOSITION", and filed on Jun. 16, 2017, the disclosures for which are hereby incorporated herein in their entireties by reference.

TECHNICAL FIELD

The present disclosure relates generally to the field of computer technologies, and more particularly, to a method, device and nonvolatile computer-readable medium for image composition.

BACKGROUND

With development of information technology, the field that involved in image processing techniques was more and more extensive. The application of image processing is needed in such field, for example, transportation, healthcare, or aerospace industry. In actual processing, the image is generally required to show a scene as real as possible, with low distortion, in order to ensure more accurate determination on the application scene, and improve image recognition.

SUMMARY

The present disclosure provides a method, device, and computer-readable medium for image composition, which can reduce noise in an image.

According to one aspect of the disclosure, a method for image composition is provided, including: acquiring a plurality of images to be processed for a scene, and brightness information of each of the plurality of images to be processed respectively; acquiring difference information for the each of the plurality of images to be processed based on the brightness information of the each of the plurality of images to be processed, and obtaining a reference image from the plurality of images to be processed based on the difference information for the each of the plurality of images to be processed; acquiring a weight of each of the plurality of images to be processed respectively based on feature information of the reference image and feature information of the plurality of images to be processed; and compositing the plurality of images to be processed based on the weight of the each of the plurality of images to be processed.

According to an additional aspect of the disclosure, a device for image composition is provided, including: a processor; and a memory including instructions operable to be executed by the processor to cause the processor to: acquire a plurality of images to be processed for a scene, and brightness information of each of the plurality of images to be processed; acquire difference information for the each of the plurality of images to be processed based on the brightness information of the each of the plurality of images to be processed; obtain a reference image from the plurality of images to be processed based on the difference information for the each of the plurality of images to be processed; acquire a weight of the each of the plurality of images to be processed based on feature information of the reference image and feature information of the plurality of images to be processed; and composite the plurality of images to be processed based on the weight of the each of the plurality of images to be processed.

According to a further aspect of the disclosure, a non-volatile computer readable storage medium for storing computer executable instructions is provided. The computer executable instructions are used to control a device to execute a method for image composition, the method including: acquiring a plurality of images to be processed for a scene, and brightness information of each of the plurality of images to be processed respectively; acquiring difference information for the each of the plurality of images to be processed based on the brightness information of the each of the plurality of images to be processed; obtaining a reference image from the plurality of images to be processed based on the difference information for the each of the plurality of images to be processed; acquiring a weight of each of the plurality of images to be processed respectively based on feature information of the reference image and feature information of the plurality of images to be processed; and compositing the plurality of images to be processed based on the weight of each of the plurality of images to be processed.

DETAILED DESCRIPTION

To make objectives, technical solutions, and advantages of the present disclosure clearer, the following further describes the present disclosure in detail with reference to the accompanying drawings and embodiments. It should be understandable that the specific embodiments to be described are only used to explain the present disclosure and are not intended to limit the present disclosure.

Figure 1:
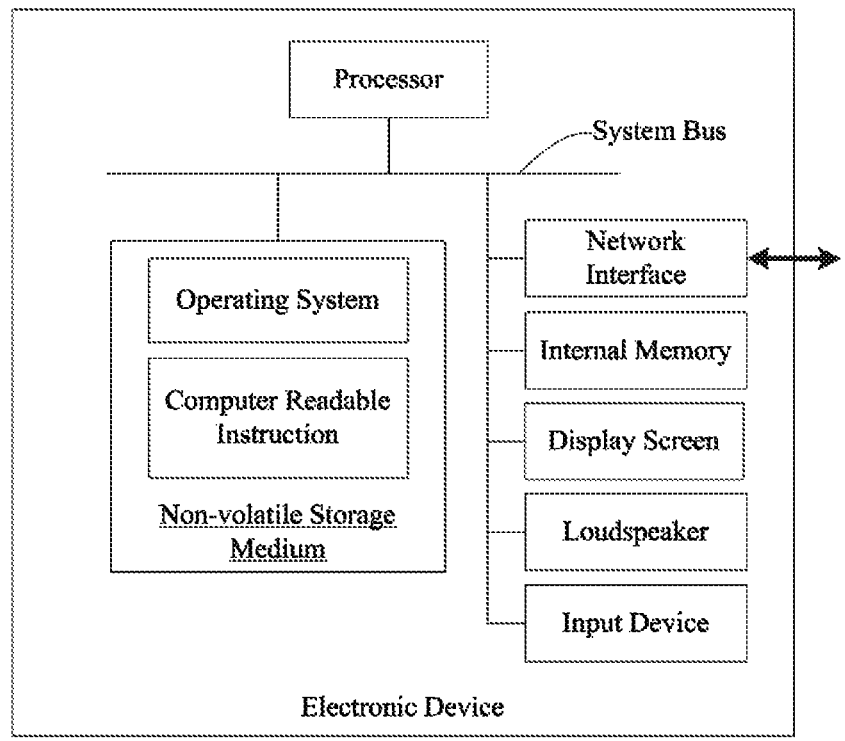
FIG. 1 is a structural schematic diagram illustrating an electronic device according to one embodiment.

FIG. 1 is a structural schematic diagram illustrating an electronic device according to one embodiment. As shown in FIG. 1, the electronic device includes a processor, a non-volatile storage medium, an internal memory, a network interface, a display screen and an input device connected to each other through system bus. The non-volatile storage medium of the electronic device stores an operating system and computer readable instructions. When the computer readable instructions are executed by the processor, the processor is caused to implement a method for image composition. The processor is used to provide computing and control ability to support the operation of the whole electronic device. The internal memory in the electronic device provides an environment for the operation of the computer readable instructions stored on the non-volatile storage medium. The network interface is used for network communication with the server, for example, transmitting a request for image composition to a server, and receiving a composition parameter from the server. The display screen of the electronic device may be a liquid crystal display or an E-Ink screen. The input device may be a touch layer covered on the display screen, or a key, a trackball or a touchpad arranged on a housing of the electronic device, or an external keyboard, touchpad or mouse. The electronic device may be a mobile phone, a tablet computer, a personal digital assistant or a wearable device. It is understood by those skilled in the art that the configuration shown in FIG. 1 is a block diagram of a part related to the solution according to this application, and is not intended to limit the electronic device on which the solution according to this application can be applied. A specific electronic device may include more or less components than those shown in the drawing, combine some components, or have a different arrangement of the components.

Figure 2:
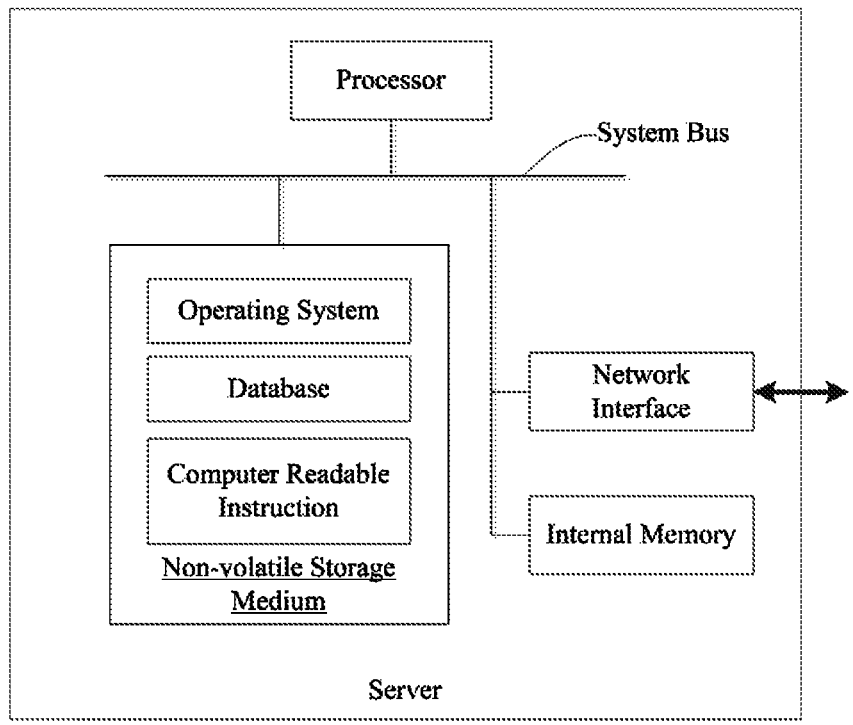
FIG. 2 is a structural schematic diagram illustrating a server according to one embodiment.

FIG. 2 is a structural schematic diagram illustrating a server according to one embodiment. As shown in FIG. 2, the server includes a processor, a non-volatile storage medium, an internal memory and a network interface connected to each other through system bus. The non-volatile storage medium of the server stores an operating system and computer readable instructions. When the computer readable instructions are executed by the processor, the processor is caused to implement a method for image composition. The processor of the server is used to provide computing and control ability to support the operation of the whole server. The network interface of the server is used to communicate with an external terminal through a network connection, for example, receiving a request for image composition from a terminal, and transmitting a composition parameter to the terminal. The server may be an independent server or a server cluster formed by a plurality of servers. It is understood by those skilled in the art that the configuration shown in FIG. 2 is a block diagram of a part related to the solution according to this application, and is not intended to limit the server on which the solution according to this application can be applied. A specific server may include more or less components than those shown in the drawing, combine some components, or have a different arrangement of the components.

Figure 3:
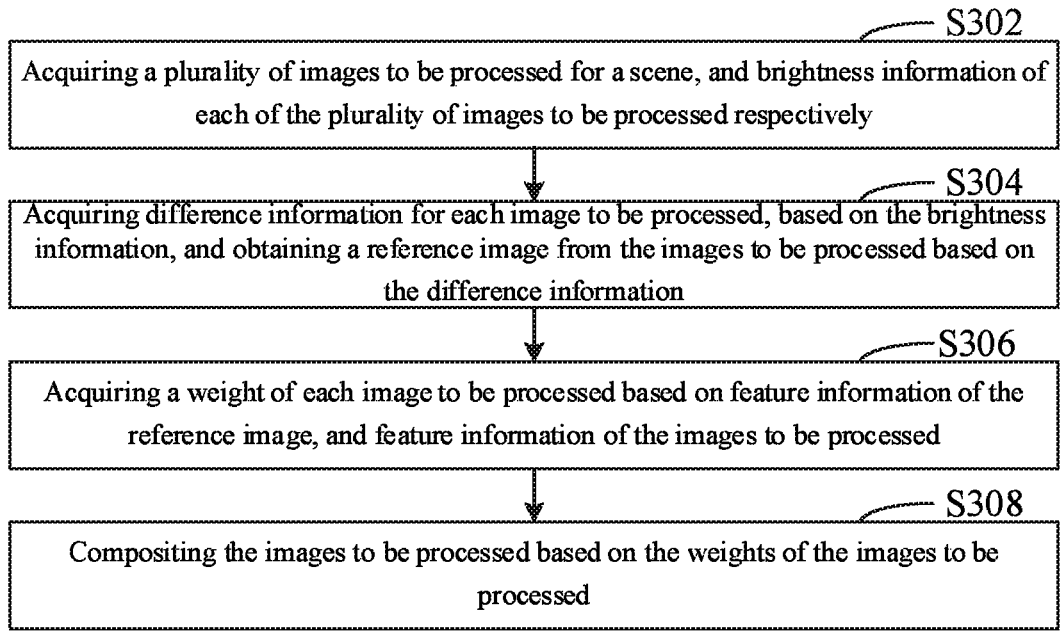
FIG. 3 is a flow diagram illustrating a method for image composition according to one embodiment.

FIG. 3 is a flow diagram illustrating a method for image composition according to one embodiment. As shown in FIG. 3, the method for image composition may be implemented as below.

At 302, a plurality of images to be processed for a scene, and brightness information of each of the plurality of images to be processed are acquired.

In one embodiment, an image to be processed refers to an image required to be composited, which can be acquired by an image acquisition device. The image acquisition device refers to a device for acquiring images, for example, the image acquisition device may be a camera, a camera on a mobile terminal, a video camera or the like.

A plurality of images to be processed for a scene may be captured continuously, and the captured images to be processed may be stored. The number of the images to be processed may be preset, and may vary with application scenarios or performance requirements. The images to be processed may be stored according to a preset storage path. When these images are required to be composited, they can be acquired according to the preset storage path. The brightness information refers to a parameter representing brightness of an image.

For example, when an image to be processed is to be captured by a mobile terminal, a user may input an instruction for capturing image into the mobile terminal, and after detecting the instruction, the mobile terminal may capture a plurality of images to be processed through a camera. The instruction for capturing image may be activated by a physical button on the mobile terminal or an action on a touch screen, or may be a voice instruction.

At 304, difference information for each image to be processed is acquired based on the brightness information of each image to be processed, and a reference image is obtained from the images to be processed based on the difference information for each image to be processed.

In one embodiment, the difference information refers to a difference value related to the brightness information of the image to be processed. For example, a reference value may be set in advance. And then the difference between a brightness value of the image to be processed and the reference value may be obtained as the difference information of the image to be processed. Since each pixel in the image to be processed has respective brightness information, the difference information may refer to a set of difference information of each pixel in the image to be processed, or may refer to a difference between an average value of brightness values of pixels in the image to be processed. Alternatively, one pixel may be selected randomly from the pixels in the image to be processed, a brightness value of the pixel may be sampled, and a difference between the brightness value and the reference value may be obtained as the difference information.

The reference image refers to an image to be processed with difference value meeting a preset rule, selected from the images to be processed, as a reference image used in image composition. For example, an image to be processed with maximum difference information may be selected as the reference image.

At S306, a weight of each image to be processed is acquired based on feature information of the reference image and feature information of the images to be processed.

In one embodiment, the feature information refers to information related to a feature of an image, for example, brightness, gray scale, color or saturation of the image. The weight refers to a proportion for composition of an image to be processed used in the image composition. Generally, the sum of the weights of all of the plurality of images to be processed is 1, and an image with a greater weight means the proportion of this image is greater during the image composition.

At 308, the images to be processed are composited based on the weight of each image to be processed.

In one embodiment, the image composition refers to compositing a plurality of images to be processed into a composited image according to a specific rule. Specifically, gray values or color values of pixels in a same position of the images to be processed are combined according to a specific rule, to form a composited image.

According to the above method for image composition, a plurality of images for a scene can be acquired firstly, a reference image can be determined from the plurality of images based on the brightness information of each of the plurality of images, a weight of each of the plurality of images can be acquired based on the feature information of the reference image and the plurality of images, and the plurality of images can be composited based on the weights of the plurality of images. In this way, an image with a greater brightness difference will have a lower weight, which can avoid random noise generated during the process of acquiring images, and reduce image distortion.

Figure 4:
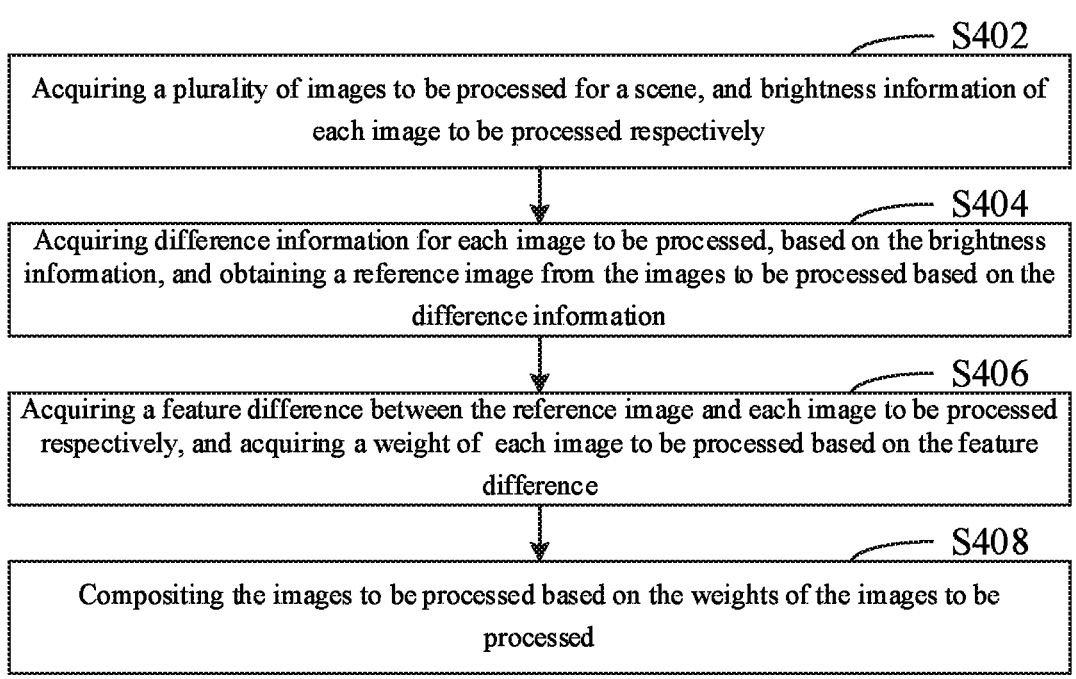
FIG. 4 is a flow diagram illustrating a method for image composition according to another embodiment.

FIG. 4 is a flow diagram illustrating a method for image composition according to another embodiment. As shown in FIG. 4, the method for image composition may be implemented as below.

At 402, a plurality of images to be processed for a scene, and brightness information of each of the plurality of images to be processed are acquired.

Specifically, an image to be processed refers to a digital image represented by two-dimensional numerical pixels. The pixel is a basic element of a digital image. A position of each pixel in the digital image may be represented by position coordinates, and a gray value or color value of the pixel may be represented by an integer between 0 and 255. The gray value or color value may represent brightness, color, saturation and other information of the pixel. Each pixel thus has respective brightness information. The brightness information of the image to be processed refers to a set of brightness information of all pixels in the image to be processed.

In one embodiment, a plurality of images to be processed for a scene is acquired, and the images to be processed are images at a same focal length. Specifically, since a front-facing camera of the mobile terminal has a prime lens, the front-facing camera of the mobile terminal can be used to acquire a plurality of images to be processed for a scene.

At 404, difference information for each image to be processed is acquired based on the brightness information of each image to be processed, and a reference image is obtained from the images to be processed based on the difference information for each image to be processed.

In one embodiment, one image to be processed is selected from the plurality of images to be processed sequentially, a brightness difference between brightness information of the selected image to be processed and brightness information of each of remaining images to be processed is obtained respectively, and difference information of the selected image to be processed is obtained. That is, in this embodiment, the difference information of the image to be processed refers to a set of differences between the brightness information of the selected image to be processed and brightness information of each of remaining images to be processed respectively.

Further, a number of brightness differences meeting a preset condition in the brightness differences corresponding to each of images to be processed are counted, and an image to be processed with a maximum number of brightness differences meeting the preset condition is selected as the reference image. The preset condition refers to a condition for selecting difference information, which is set in advance, for example, the preset condition may be a condition in which the brightness difference is greater than a specific threshold.

Specifically, each image to be processed may have a plurality of brightness differences, the plurality of brightness differences may be selected according to a preset condition, and a number of selected brightness differences for each image to be processed may be counted. The images to be processed may be arranged in a descending order based on the counted number of the brightness differences that meet the preset condition, and the first image to be processed may be selected as the reference image.

For example, it is assumed that four images to be processed are acquired, and average brightness values of the four images to be processed are 21, 20, 19 and 16 respectively. Firstly, taking the second image to be processed as an example, this image to be processed has an average brightness value of 20. The difference between the average brightness value of the second image to be processed and an average brightness of each of remaining images to be processed is obtained respectively, and the obtained difference is held if the obtained difference is within 10 percent of the average brightness value of the second image to be processed, so the held difference is in a range of [0, 2], that is, the average brightness value corresponding the difference to be held is in a range of [22, 18]. In this case, the first and third images are held, and the number of the brightness differences meeting the preset condition is 2. The number of the brightness differences meeting the preset condition may be counted for all of the four images to be processed. The numbers of the brightness differences meeting the preset condition of the four images to be processed are 1, 2, 1 and 0, so the second image to be processed can be selected as the reference image.

Further, the reference image may be obtained based on brightness information of the image to be processed with the maximum number of brightness differences meeting the preset condition, if the number of the image to be processed with the maximum number of brightness differences meeting the preset condition exceeds a preset number.

Specifically, if the images to be processed are sorted based on the number of the brightness differences meeting the preset condition, and the number of the images to be processed with the maximum number of brightness differences meeting the preset condition exceeds the preset number, the images to be processed can be further filtered based on the brightness information of the images to be processed. For example, the image to be processed having the maximum number of brightness differences meeting the preset condition and having the maximum brightness value may be selected as the reference image.

At 406, a feature difference between the feature information of the reference image and the feature information of each image to be processed is acquired, and the weight of each image to be processed is acquired based on the feature difference.

In one embodiment, the feature information refers to information related to a feature of an image, which may be one or more of brightness, gray scale, color and saturation of the image. Specially, the average brightness values of the reference image and the images to be processed may be acquired respectively, a brightness difference between the average brightness value of the reference image and the average brightness of each of the images to be processed may be acquired respectively, and the weight of each of the images to be processed may be acquired based on the brightness differences.

A correspondence between the brightness difference and the weight may be preset, and the weight of each image to be processed may be acquired based on the correspondence between the brightness difference and the weight. Alternatively, an acquisition rule may be preset, the weight of each image to be processed may be acquired based on both of the preset rule and the brightness difference.

Further, a feature difference between the feature information of the reference image and the feature information of each of the images to be processed may be acquired respectively, the feature difference may be normalized, and the normalized feature difference may be selected as the weight of each image to be processed.

For example, it is assumed that there are four images to be processed, with brightness differences of A1, A2, A3 and A4 respectively, in which the maximum value in the brightness differences is expressed as Amax, and the minimum value in the brightness differences is expressed as Amin. The normalized brightness difference is Dx, Dx=(Ax−Amin)/(Amax−Amin). In this way, the normalized brightness difference Dx is in a range of 0 to 1. Such normalized feature difference may be selected as the weight of the image to be processed, which is used to represent a proportion for composition of the image to be processed used in the image composition.

At 408, the images to be processed are composited based on the weight of each image to be processed.

In one embodiment, after the weight of each of the plurality of images to be processed is acquired, the plurality of images to be processed may be composited based on the weights of the images to be processed.

According to the above method for image composition, a plurality of images for a scene can be acquired firstly, a reference image can be determined from the plurality of images based on the brightness information of each of the plurality of images, a weight of each of the plurality of images can be acquired based on the feature information of the reference image and the plurality of images, and the plurality of images can be composited based on the weights of the plurality of images. In this way, an image with a greater brightness difference will have a lower weight, which can avoid random noise generated during the process of acquiring images, and reduce image distortion.

Figure 5:
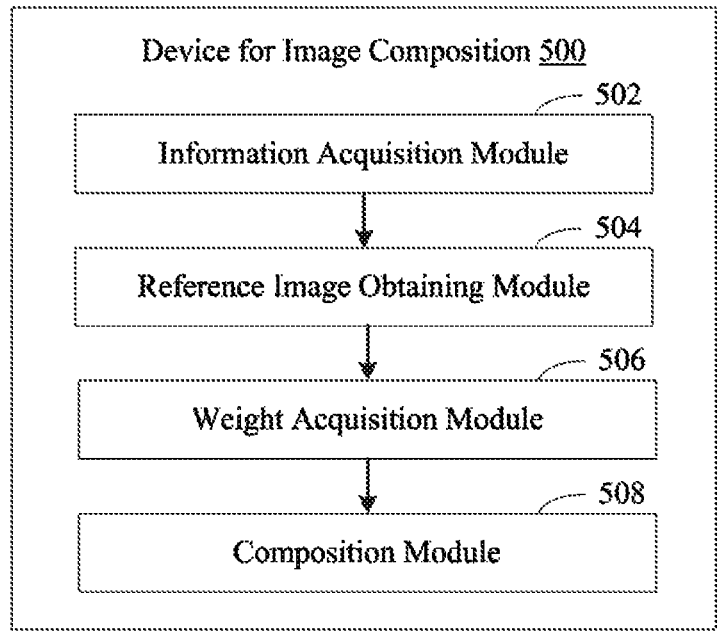
FIG. 5 is a structural schematic diagram illustrating a device for image composition according to one embodiment.

FIG. 5 is a structural schematic diagram illustrating a device for image composition according to one embodiment. As shown in FIG. 5, the device for image composition includes an information acquisition module 502, a reference image obtaining module 504, a weight acquisition module 506 and a composition module 508.

The information acquisition module 502 is configured to acquire preset number of images to be processed for a scene, and brightness information of each of the plurality of images to be processed respectively.

The reference image obtaining module 504 is configured to acquire difference information for each of the plurality of images to be processed based on the brightness information of the each of the plurality of images to be processed, and obtain a reference image from the plurality of images to be processed based on the difference information for the each of the plurality of images to be processed.

The weight acquisition module 506 is configured to acquire a weight of each of the plurality of images to be processed based on feature information of the reference image and feature information of the plurality of images to be processed; and The composition module 508 is configured to composite the plurality of images to be processed based on the weight of each of the plurality of images to be processed.

According to the above device for image composition, a plurality of images for a scene can be acquired firstly, a reference image can be determined from the plurality of images based on the brightness information of each of the plurality of images, a weight of each of the plurality of images can be acquired based on the feature information of the reference image and the plurality of images, and the plurality of images can be composited based on the weights of the plurality of images. In this way, an image with a greater brightness difference will have a lower weight, which can avoid random noise generated during the process of acquiring images, and reduce image distortion.

In one embodiment, the reference image obtaining module 504 is further configured to select one image to be processed from the plurality of images to be processed sequentially, obtain a brightness difference between brightness information of the selected image to be processed and brightness information of each of remaining images to be processed respectively, and obtaining difference information of the selected image to be processed.

In one embodiment, the reference image obtaining module 504 is further configured to count a number of brightness differences meeting a preset condition in the brightness differences corresponding to the each of the plurality of images to be processed, and select an image to be processed with a maximum number of brightness differences meeting the preset condition as the reference image.

In one embodiment, the reference image obtaining module 504 is further configured to obtain the reference image based on brightness information of the image to be processed with the maximum number of brightness differences meeting the preset condition, if a number of the image to be processed with the maximum number of brightness differences meeting the preset condition exceeds a preset number.

In one embodiment, the weight acquisition module 506 is further configured to acquire a feature difference between the feature information of the reference image and the feature information of the each of the plurality of images to be processed, and acquire the weight of the each of the plurality of images to be processed based on the feature difference.

The division of the modules in the above device for image composition is only shown as an example. In other embodiments, the device for image composition may be divided into different module as required, to achieve all or a part of function of the above device for image composition.

A computer readable storage medium is provided in the embodiment of the present disclosure. The computer readable storage medium has a stored thereon computer program. When the computer program is executed by a processor, the processor is caused to execute following steps:

acquiring a plurality of images to be processed for a scene, and brightness information of each of the plurality of images to be processed respectively;

acquiring difference information for the each of the plurality of images to be processed respectively based on the brightness information of the each of the plurality of images to be processed;

obtaining a reference image from the plurality of images to be processed based on the difference information for the each of the plurality of images to be processed;

acquiring a weight of each of the plurality of images to be processed respectively based on feature information of the reference image and feature information of the plurality of images to be processed; and compositing the plurality of images to be processed based on the weight of each of the plurality of images to be processed.

In one embodiment, the acquiring the difference information for the each of the plurality of images to be processed respectively based on the brightness information executed by the processor includes:

selecting one image to be processed from the plurality of images to be processed sequentially; obtaining a brightness difference between brightness information of the selected image to be processed and brightness information of each of remaining images to be processed respectively; and obtaining difference information of the selected image to be processed.

In one embodiment, the obtaining the reference image from the plurality of images to be processed based on the difference information for the each of the plurality of images to be processed executed by the processor includes:

counting a number of brightness differences meeting a preset condition in the brightness differences corresponding to the each of the plurality of images to be processed; and selecting an image to be processed with a maximum number of brightness differences meeting the preset condition as the reference image.

In one embodiment, the selecting the image to be processed with a maximum number of brightness differences meeting the preset condition as the reference image executed by the processor includes:

obtaining the reference image based on brightness information of the image to be processed with the maximum number of brightness differences meeting the preset condition, if a number of the image to be processed with the maximum number of brightness differences meeting the preset condition exceeds a preset number.

In one embodiment, the acquiring the weight of each of the plurality of images to be processed respectively based on the feature information of the reference image and the feature information of the plurality of images to be processed executed by the processor includes:

acquiring a feature difference between the feature information of the reference image and the feature information of the each of the plurality of images to be processed, and acquiring the weight of the each of the plurality of images to be processed based on the feature difference.

Figure 6:
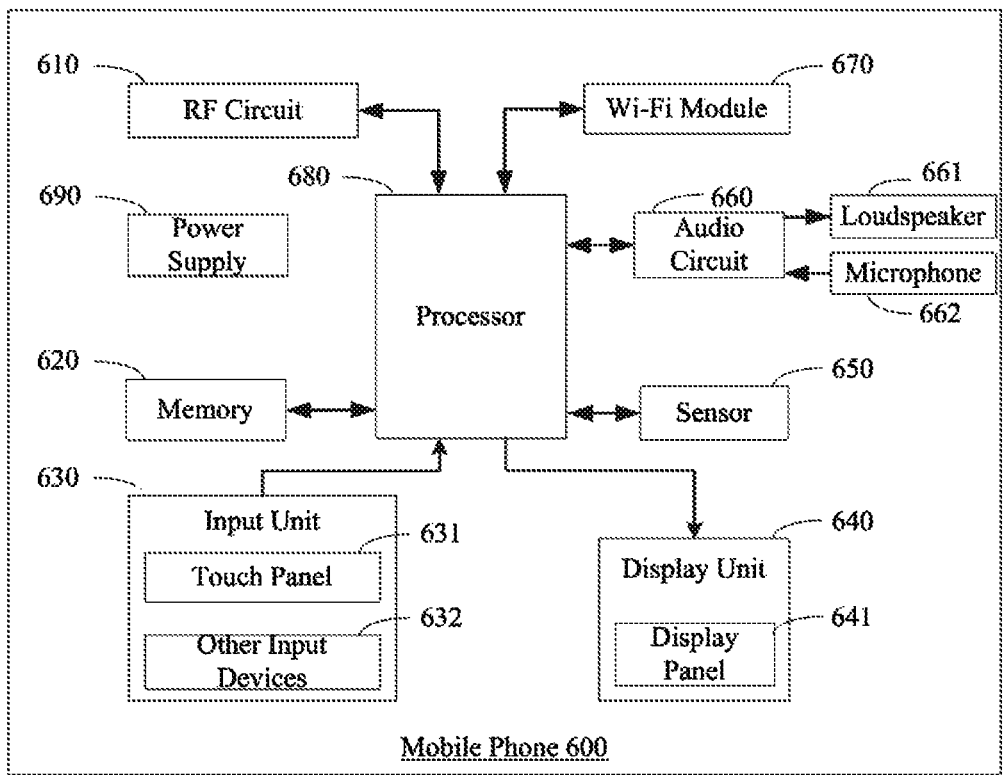
FIG. 6 is a block diagram illustrating a part of a mobile phone related to a computer device provided in embodiments of the present disclosure.

A computer device is also provided in the embodiment of the present disclosure. As shown in FIG. 6, for illustration purposes, only parts related to the embodiment of the present disclosure are shown. For undisclosed specific technical details, please refer to descriptions of the methods mentioned in the above embodiments of the present disclosure. The computer device may include mobile phone, tablet computer, personal digital assistant (PDA), point of sales (POS), on-board computer, wearable device and any other terminal devices. The following description is taking the mobile phone as an example of the mobile phone.

FIG. 6 is a block diagram illustrating a part of a mobile phone related to a computer device provided in embodiments of the present disclosure. As shown in FIG. 6, the mobile phone includes a radio frequency (RF circuit) 610, a memory 620, an input unit 630, a display unit 640, a sensor 650, an audio circuit 660, a wireless fidelity (Wi-Fi) module 670, a processor 680 and a power supply 690. It is understood by those skilled in the art that the configuration of the mobile phone as shown in FIG. 6 should not be interpreted to limit the mobile phone, more or less components may be included, some components may be combined, and a different arrangement of the components may be used.

The RF circuit 610 may be configured to receive and transmit signals in a process of sending and receiving a message or in a communication process, particularly, receive a downlink message from a base station and send it to the processor 680 for processing, and send uplink data to the base station. The RF circuit 610 generally includes, but is not limited to an antenna, at least one amplifier, a transceiver, a coupler, a low noise amplifier (LNA), and a duplexer. In addition, the RF circuit 610 may communicate with Internet or other devices via wireless communication. The above wireless communication may adopt any communication standard or protocol, including but not limited to GSM (Global System for Mobile communication), GPRS (General Packet Radio Service), CDMA (Code Division Multiple Access), WCDMA (Wideband Code Division Multiple Access), LTE (Long Term Evolution), E-mail and SMS (Short Messaging Service).

The memory 620 may be configured to store software programs and modules, and the processor 680 may implement various applications and data processing of the mobile phone by running the software programs and modules stored in the memory 620. The memory 620 may include a program storage area and a data storage area. The program storage area may be configured to store an operating system, and an application program required by at least one function (for example, a voice broadcast function and an image display function). The data storage area may be configured to store data (for example, audio data and a contact list) created according to the use of the mobile phone. In addition, the memory 620 may include a high speed random access memory, and may also include a non-transitory memory, for example, at least one magnetic disk memory, flash memory, or any other transitory solid-state memories.

The input unit 430 may be configured to receive number or character information, and generate key signal input associated with user settings and function control of the mobile phone 600. Specifically, the input unit 630 may include a touch panel 631, and other input device 632. The touch panel 631, also known as touch screen, can capture user touch operations on or near the touch panel (such as the user touch operations on or near the touch panel 631 using a finger, stylus, and any other suitable object or accessories), and drive a corresponding connecting device according to a preset program. In one embodiment, the touch panel 631 may include a touch detector and a touch controller. The touch detector detects the touch position of the user, creates detection a signal caused by the touch operation, and transmits the signal to the touch controller. The touch controller receives touch information from the touch detector, converts it into contact coordinates, and sends the coordinates to the processor 680. The touch controller also receives commands from the processor 680. Further, the touch panel 631 may be implemented in various types such as a resistive type, a capacitive type, an infrared type, and a surface acoustic wave type. In addition to the touch panel 631, the input unit 630 may further include other input devices 632. Specifically, the other input devices 632 may include but are not limited to one or more of a physical keyboard, a function button (for example, a volume control button, a power button, or the like), a trackball, a mouse, and an operating rod.

The display unit 640 may be configured to display information input by the user, or information provided for the user and various menus of the mobile phone. The display unit 640 may include a display panel 641. In one embodiment, the display panel 641 may be configured as a liquid crystal display (Liquid Crystal Display, LCD), or an organic light-emitting diode (Organic Light-Emitting Diode, OLED). In one embodiment, the touch panel 631 may cover the display panel 641, and when the touch panel 631 detects a touch operation performed on the touch panel 631, the touch panel 631 may transmit the touch operation to the processor 680 to determine a type of a touch event. Then, the processor 680 provides a corresponding visual output on the display panel 641 according to the type of the touch event. Although the touch panel 631 and the display panel 641 perform the input and output functions of the mobile phone respectively as two separate components in FIG. 6, the touch panel 631 and the display panel 641 may be integrated to perform both the input and output functions in other embodiments.

The mobile phone 600 may further include at least one sensor 650, such as optical sensor, motion sensor and other sensors. Specifically, the optical sensor may include an environment light sensor and a proximity sensor, in which the environment light sensor may be used to adjust the brightness of the display screen 641 according to ambient brightness, and the proximity sensor may be configured to turn off the display screen 641 and/or backlight when the mobile phone moves to a position near the ear. The motion sensor may include an acceleration sensor. The acceleration sensor can detect acceleration in various directions, detect a value and a direction of the gravity when the mobile phone is in a static state, and be used in an application for identifying a mobile phone posture (such as switching between a landscape and a portrait, a related game, and magnetometer posture calibration), a vibration identification related function (such as a pedometer and knocking), and the like. The mobile phone may be equipped with other sensors such as gyroscope, barometer, hygrometer, thermometer, and infrared sensor.

The audio circuit 660, the loudspeaker 661 and the microphone 662 can provide an audio interface between the user and the mobile phone. The audio circuit 660 can convert the received audio data into electric signals, and transmit the electric signals to the loudspeaker 661. The loudspeaker 661 can convert the electric signals to sound signals for outputting. On the other hand, the microphone 662 can convert the collected sound signals into electric signals, and the audio circuit 660 can receive the electric signals and converts the electric signals into audio data, and output the audio data to the processor 680 for processing. Then, the audio data may be sent to another mobile phone by the RF circuit 610, or the audio data may be output to the memory 620 for further processing.

Wi-Fi belongs to a short distance wireless transmission technology. The mobile phone can facilitate the user to send and receive an email, browse a webpage and access a streaming medium via the Wi-Fi module, which provides the user with wireless wideband internet access. Although FIG. 6 shows the Wi-Fi module 670, it may be understood that the Wi-Fi mode 670 is not a necessary part of the mobile phone, and may be omitted as required.

The processor 680 is a control center of the mobile phone, which is connected to various parts of the entire mobile phone by using various interfaces and lines, and executes various functions of the mobile phone and processes data by running or executing a software program and/or module stored in the memory 620 and invoking data stored in the memory 620, so as to perform overall monitoring on the mobile phone. In one embodiment, the processor 680 may include one or more processing units. In one embodiment, the processor 680 may be integrated with an application processor and a modem processor. The application processor mainly processes an operating system, a user interface, an application program, and the like. The modem processor mainly processes wireless communications. It may be understood that, the foregoing modem processor may not be integrated into the processor 680.

The mobile phone 600 further includes a power supply 490 (for example, a battery) that supplies power to various components. Preferably, the power supply may be logically connected to the processor 680 by using a power supply management system, so as to implement functions such as charging, discharging, and power consumption management by using the power supply management system.

In one embodiment, when the computer program stored on the memory is executed by the processor 680 included in the mobile phone, the following steps may be implemented:

acquiring a plurality of images to be processed for a scene, and brightness information of each of the plurality of images to be processed respectively;

acquiring difference information for the each of the plurality of images to be processed respectively based on the brightness information of the each of the plurality of images to be processed;

obtaining a reference image from the plurality of images to be processed based on the difference information for the each of the plurality of images to be processed;

acquiring a weight of the each of the plurality of images to be processed respectively based on feature information of the reference image and feature information of the plurality of images to be processed; and compositing the plurality of images to be processed based on the weight of each of the plurality of images to be processed.

In one embodiment, the acquiring the difference information for the each of the plurality of images to be processed respectively based on the brightness information executed by the processor 608 includes:

selecting one image to be processed from the plurality of images to be processed sequentially; obtaining a brightness difference between brightness information of the selected image to be processed and brightness information of each of remaining images to be processed respectively; and obtaining difference information of the selected image to be processed.

In one embodiment, the obtaining the reference image from the plurality of images to be processed based on the difference information for the each of the plurality of images to be processed executed by the processor 608 includes:

counting a number of brightness differences meeting a preset condition in the brightness differences corresponding to each of the plurality of images to be processed; and selecting an image to be processed with a maximum number of brightness differences meeting the preset condition as the reference image.

In one embodiment, the selecting the image to be processed with a maximum number of brightness differences meeting the preset condition as the reference image executed by the processor 608 includes:

obtaining the reference image based on brightness information of the image to be processed with the maximum number of brightness differences meeting the preset condition, if a number of the image to be processed with the maximum number of brightness differences meeting the preset condition exceeds a preset number.

In one embodiment, the acquiring the weight of each of the plurality of images to be processed respectively based on the feature information of the reference image and the feature information of the plurality of images to be processed executed by the processor 608 includes:

acquiring a feature difference between the feature information of the reference image and the feature information of the each of the plurality of images to be processed, and acquiring the weight of the each of the plurality of images to be processed based on the feature difference.

Those skilled in the art may understand that all or a part of the steps of the methods in the above embodiments may be implemented by program instruction relevant hardware. The program may be stored in a non-transitory computer readable storage medium. When the program is executed, the program can for example, include flows of various methods in the above embodiments. The storage medium may include a magnetic disk, an optical disc, and a read-only memory (ROM).

The above described embodiments are merely preferred embodiments of the disclosure, but not intended to limit the disclosure. Any modifications, equivalent alternations and improvements that are made within the spirit and scope of the disclosure should be included in the protection scope of the disclosure. Accordingly, the scope of the disclosure is defined by the appended claims rather than the foregoing description and the exemplary embodiments described therein.

What is claimed is:

1. A method for image composition, comprising:
   acquiring a plurality of images to be processed for a scene, and brightness information of each of the plurality of images to be processed respectively;
   acquiring difference information for the each of the plurality of images to be processed based on the brightness information of the each of the plurality of images to be processed;
   obtaining a reference image from the plurality of images to be processed based on the difference information for the each of the plurality of images to be processed;
   acquiring a weight of the each of the plurality of images to be processed based on feature information of the reference image and feature information of the plurality of images to be processed; and
   compositing the plurality of images to be processed based on the weight of the each of the plurality of images to be processed,
   wherein acquiring the difference information for the each of the plurality of images to be processed based on the brightness information of the each of the plurality of images comprises:
   selecting one image to be processed from the plurality of images to be processed sequentially;
   obtaining a brightness difference between brightness information of the selected image to be processed and brightness information of each of remaining images to be processed respectively; and
   obtaining difference information of the selected image to be processed,
   wherein obtaining the reference image from the plurality of images to be processed based on the difference information for the each of the plurality of images to be processed comprises:
   counting a number of brightness differences meeting a preset condition in the brightness differences corresponding to the each of the plurality of images to be processed; and
   selecting an image to be processed with a maximum number of brightness differences meeting the preset condition as the reference image.

2. The method of claim 1, wherein the preset condition is a condition in which the brightness difference is greater than a preset threshold.

3. The method of claim 1, wherein selecting the image to be processed with a maximum number of brightness differences meeting the preset condition as the reference image comprises:
   obtaining the reference image based on brightness information of the image to be processed with the maximum number of brightness differences meeting the preset condition, if a number of the image to be processed with the maximum number of brightness differences meeting the preset condition exceeds a preset number.

4. The method of claim 3, wherein obtaining the reference image based on brightness information of the image to be processed with the maximum number of brightness differences meeting the preset condition comprises:
   selecting the image to be processed having the maximum number of brightness differences meeting the preset condition and having the maximum brightness value as the reference image.

5. The method of claim 1, wherein acquiring the weight of the each of the plurality of images to be processed respectively based on the feature information of the reference image and the feature information of the plurality of images to be processed comprises:
   acquiring a feature difference between the feature information of the reference image and the feature information of the each of the plurality of images to be processed, and acquiring the weight of the each of the plurality of images to be processed based on the feature difference.

6. The method of claim 5, wherein acquiring the weight of the each of the plurality of images to be processed based on the feature difference comprises:
   presetting a correspondence between the feature difference and the weight, and acquiring the weight of the each of the plurality of images to be processed based on the correspondence between the feature difference and the weight.

7. The method of claim 5, wherein acquiring the weight of the each of the plurality of images to be processed based on the feature difference comprises:
   normalizing the feature difference, and selecting the normalized feature difference as the weight of the image to be processed.

8. A device for image composition, comprising:
   a processor; and
   a memory including instructions operable to be executed by the processor to cause the processor to:
   acquire a plurality of images to be processed for a scene, and brightness information of each of the plurality of images to be processed;
   acquire difference information for the each of the plurality of images to be processed based on the brightness information of the each of the plurality of images to be processed;
   obtain a reference image from the plurality of images to be processed based on the difference information for the each of the plurality of images to be processed;
   acquire a weight of the each of the plurality of images to be processed based on feature information of the reference image and feature information of the plurality of images to be processed; and
   composite the plurality of images to be processed based on the weight of the each of the plurality of images to be processed,
   wherein acquiring the difference information for the each of the plurality of images to be processed based on the brightness information of the each of the plurality of images to be processed comprises:
   selecting one image to be processed from the plurality of images to be processed sequentially;
   obtaining a brightness difference between brightness information of the selected image to be processed and brightness information of each of remaining images to be processed respectively; and
   obtaining difference information of the selected image to be processed;

wherein obtaining the reference image from the plurality of images to be processed based on the difference information for the each of the plurality of images to be processed comprises:
counting a number of brightness differences meeting a preset condition in the brightness differences corresponding to the each of the plurality of images to be processed; and
selecting an image to be processed with a maximum number of brightness differences meeting the preset condition as the reference image.

9. The device of claim 8, wherein the preset condition is a condition in which the brightness difference is greater than a preset threshold.

10. The device for image composition of claim 8, wherein taking the image to be processed with a maximum number of brightness differences meeting the preset condition as the reference image comprises:
obtaining the reference image based on brightness information of the image to be processed with the maximum number of brightness differences meeting the preset condition, if a number of the image to be processed with the maximum number of brightness differences meeting the preset condition exceeds a preset number.

11. The device for image composition of claim 10, wherein obtaining the reference image based on brightness information of the image to be processed with the maximum number of brightness differences meeting the preset condition comprises:
selecting the image to be processed having the maximum number of brightness differences meeting the preset condition and having the maximum brightness value as the reference image.

12. The device for image composition of claim 8, wherein acquiring the weight of the each of the plurality of images to be processed respectively based on the feature information of the reference image and the feature information of the plurality of images to be processed comprises:
acquiring a feature difference between the feature information of the reference image and the feature information of the each of the plurality of images to be processed, and acquiring the weight of the each of the plurality of images to be processed based on the feature difference.

13. The device for image composition of claim 12, wherein acquiring the weight of the each of the plurality of images to be processed based on the feature difference comprises:
presetting a correspondence between the feature difference and the weight, and acquiring the weight of the each of the plurality of images to be processed based on the correspondence between the feature difference and the weight.

14. The device for image composition of claim 12, wherein acquiring the weight of the each of the plurality of images to be processed based on the feature difference comprises:
normalizing the feature difference, and selecting the normalized feature difference as the weight of the image to be processed.

15. A non-transitory computer readable storage medium storing computer executable instructions configured to control a device to execute a method for image composition, the method comprising:
acquiring a plurality of images to be processed for a scene, and brightness information of each of the plurality of images to be processed respectively;
acquiring difference information for the each of the plurality of images to be processed based on the brightness information of the each of the plurality of images to be processed;
obtaining a reference image from the plurality of images to be processed based on the difference information for the each of the plurality of images to be processed;
acquiring a weight of the each of the plurality of images to be processed respectively based on feature information of the reference image and feature information of the plurality of images to be processed; and
compositing the plurality of images to be processed based on the weight of each of the plurality of images to be processed,
wherein acquiring the difference information for the each of the plurality of images to be processed based on the brightness information of the each of the plurality of images comprises:
selecting one image to be processed from the plurality of images to be processed sequentially;
obtaining a brightness difference between brightness information of the selected image to be processed and brightness information of each of remaining images to be processed respectively; and
obtaining difference information of the selected image to be processed,
wherein obtaining the reference image from the plurality of images to be processed based on the difference information for the each of the plurality of images to be processed comprises:
counting a number of brightness differences meeting a preset condition in the brightness differences corresponding to the each of the plurality of images to be processed; and
selecting an image to be processed with a maximum number of brightness differences meeting the preset condition as the reference image.

16. The non-transitory computer readable storage medium of claim 15, wherein acquiring the weight of each of the plurality of images to be processed respectively based on the feature information of the reference image and the feature information of the plurality of images to be processed comprises:
acquiring a feature difference between the feature information of the reference image and the feature information of each of the plurality of images to be processed, and acquiring the weight of each of the plurality of images to be processed based on the feature difference.

* * * * *